G. S. BLAKE.
CUTTING PLIERS.
APPLICATION FILED AUG. 18, 1910.

980,861.

Patented Jan. 3, 1911.

Witnesses
Frank A. Sahle
Thomas W. McMeans

Inventor
Gene S. Blake,
By Bradford & Hood,
Attorneys.

UNITED STATES PATENT OFFICE.

GENE S. BLAKE, OF ALASKA, INDIANA, ASSIGNOR OF TWO-THIRDS TO JOHN S. SPOOR AND ONE-THIRD TO HENRY T. BLAKE, OF BROOKLYN, INDIANA, A COPARTNERSHIP.

CUTTING-PLIERS.

980,861.  Specification of Letters Patent.  Patented Jan. 3, 1911.

Application filed August 18, 1910. Serial No. 577,837.

*To all whom it may concern:*

Be it known that I, GENE S. BLAKE, a citizen of the United States, residing at Alaska, in the county of Morgan and State of Indiana, have invented a new and useful Cutting-Pliers, of which the following is a specification.

My present invention relates to that class of cutting pliers which are used by blacksmiths, especially horseshoers, and the like, for the purpose of trimming hoofs, or cutting off pieces of metal such as the points of nails, etc.

Said invention consists in the peculiar method of constructing and pivoting jaws together, as will be hereinafter more particularly described and claimed.

Figure 1:
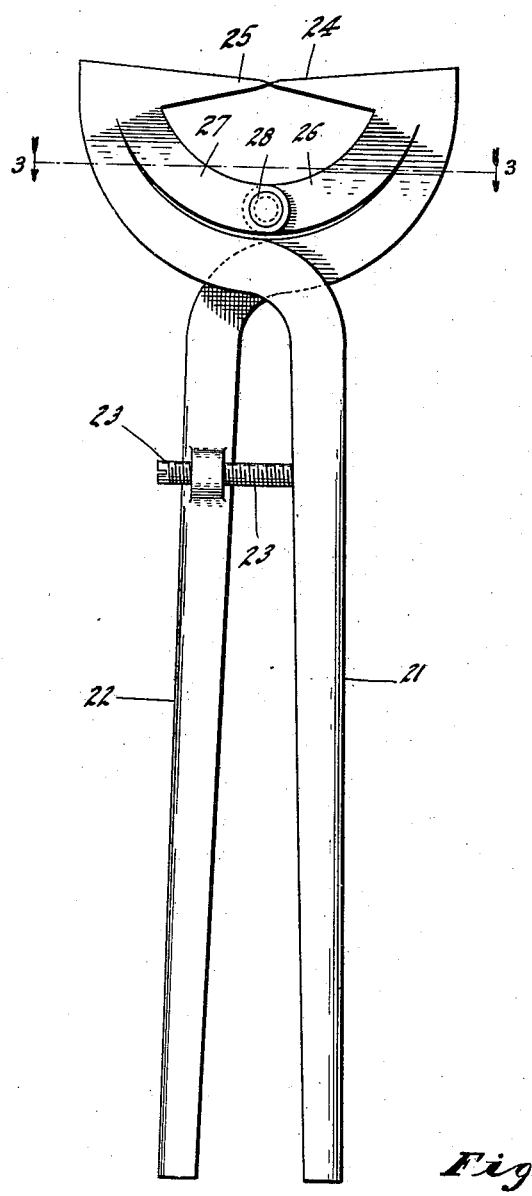
Figure 2:
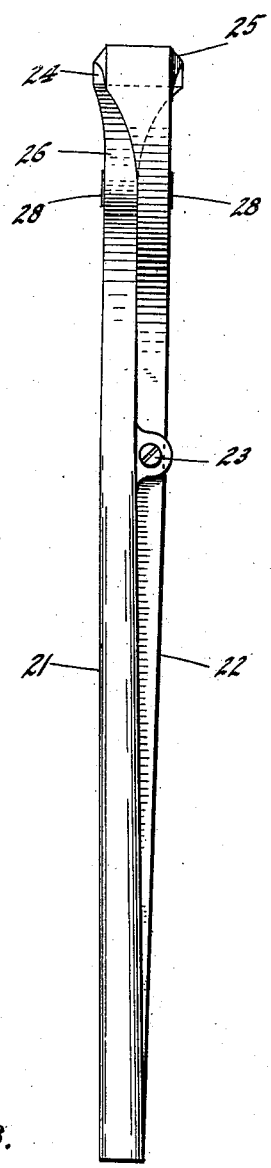
Figure 3:
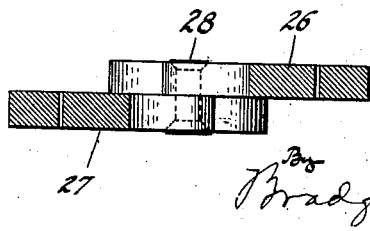

Referring to the accompanying drawings, which are made a part hereof, and on which similar reference characters indicate similar parts, Figure 1 is a side elevation of a pair of pliers embodying my said invention; Fig. 2 an edge elevation thereof, and Fig. 3 a horizontal sectional view as seen when looking downwardly from the broken line 3 3 in Fig. 1.

The handles 21 and 22 of the pliers are provided, as usual, with an adjustable stop 23 for the purpose of preventing the cutting edges of the jaws 24 and 25 from coming in contact too forcibly. The handles 21 and 22 cross each other, and are firmly attached to or integral with jaws 24 and 25, but are not themselves pivoted together. Instead, there are curved arms 26 and 27 which extend down inside the curved portions of the handles, and these are connected together where they overlap by a pivot 28. I am thus enabled to secure an elasticity of construction which gives much greater cutting power, as I have found by practical experience.

Having thus fully described my said invention, what I claim as new, and desire to secure by Letters Patent is:—

1. A cutting tool comprising two members pivoted together, each of said members comprising a handle portion and a cutting portion, and also a pivot supporting resilient finger carried by the main portion but projecting therefrom through a major portion of its length, for the purpose set forth.

2. A cutting tool comprising a pair of members pivoted together, each of said members comprising a cutting portion, a handle portion, and an intermediate pivot supporting resilient finger, the pivotal connection between the two members being between the free ends of said pivot supporting fingers.

3. A cutting tool comprising a pair of mating members, each consisting of a handle portion, a laterally displaced intermediate portion, a cutting portion lying substantially at right angles to said laterally displaced portion at the end thereof, and an intermediate resilient pivot finger connected to the main portion substantially at the juncture between the laterally displaced portion and the cutting portion and lying substantially parallel with but independent of said laterally displaced portion, and a pivot connecting the free ends of the two pivot supporting fingers.

In witness whereof, I have hereunto set my hand and seal at Indianapolis, Indiana, this sixteenth day of August, A. D. one thousand nine hundred and ten.

GENE S. BLAKE. [L. S.]

Witnesses:
 JOHN S. SPOOR,
 HENRY T. BLAKE.